US008422067B2

(12) United States Patent
Nishimachi

(10) Patent No.: US 8,422,067 B2
(45) Date of Patent: Apr. 16, 2013

(54) IMAGE FORMING APPARATUS AND METHOD UTILIZING SEE-THROUGH PREVENTION PATTERNS TO INCREASE TRANSILLUMINATION DOCUMENT SECURITY

(75) Inventor: Takashi Nishimachi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1210 days.

(21) Appl. No.: 12/256,821

(22) Filed: Oct. 23, 2008

(65) Prior Publication Data

US 2009/0110290 A1 Apr. 30, 2009

(30) Foreign Application Priority Data

Oct. 25, 2007 (JP) ................................ 2007-278012

(51) Int. Cl.
*G06K 15/00* (2006.01)
*G06K 9/74* (2006.01)
*H04N 1/387* (2006.01)

(52) U.S. Cl.
USPC ............ 358/1.18; 358/1.9; 358/2.1; 358/474; 382/213

(58) Field of Classification Search ........................ None
See application file for complete search history.

(56) References Cited

U.S. PATENT DOCUMENTS 6,341,176 B1 * 1/2002 Shirasaki et al. ............. 382/229
7,286,682 B1 * 10/2007 Sharma et al. ................ 382/100
2001/0038898 A1 * 11/2001 Maeda ......................... 428/40.1
2005/0207767 A1 * 9/2005 Imayoshi et al. ............... 399/45
2007/0253022 A1 * 11/2007 Oshima ........................ 358/1.15
2009/0161124 A1 * 6/2009 Tamura .......................... 358/1.1
2009/0262402 A1 * 10/2009 Fan et al. ...................... 358/488

FOREIGN PATENT DOCUMENTS

JP 2001-171264 A 6/2001
JP 2005-028807 A 2/2005
JP 2005-238636 A 8/2005
JP 2005-242864 A 9/2005
JP 2006-174172 A 6/2006

OTHER PUBLICATIONS

Office Action, dated Oct. 13, 2009, for corresponding Japanese patent application No. 2007-278012.

* cited by examiner

*Primary Examiner* — Vincent Rudolph

(74) *Attorney, Agent, or Firm* — Birch, Stewart, Kolasch & Birch, LLP

(57) ABSTRACT

An image forming apparatus has an image data reading section that reads image data formed on a document, an image processing section that separates regions where effective information is present from the read image data so as to determine, for every separated region, a shape of a see-through preventing pattern and a position at which the see-through preventing pattern is formed, and an image printing section that prints the determined see-through preventing pattern at a part on a back surface of a recording sheet on which the document is printed, on the basis of the information of the determined position at which the see-through preventing pattern is formed, the part corresponding to any of the regions where the effective information of the document is present.

10 Claims, 8 Drawing Sheets

TABLE

| NUMBER | ANALYZING DATA | PATTERN SHAPE 105 |
|---|---|---|
| BASIC PATTERN 1 (BACKGROUND) | 0 |  |
| BASIC PATTERN 2 (CHARACTER) | 1 |  |
| BASIC PATTERN 3 (IMAGE) | 2 |  |
| BASIC PATTERN 4 (OTHER) | 3 |  |

IMAGE FORMING APPARATUS AND METHOD UTILIZING SEE-THROUGH PREVENTION PATTERNS TO INCREASE TRANSILLUMINATION DOCUMENT SECURITY

CROSS-REFERENCE TO RELATED APPLICATION

This application is related to Japanese Patent Application No. 2007-278012 filed on Oct. 25, 2007, whose priority is claimed and the disclosure of which is incorporated by reference in its entirety.

BACKGROUND OF THE INVENTION

1. Field of the Invention

The present invention relates to an image forming apparatus, and more particularly to an image forming apparatus having a function of analyzing a type of information of image data that is to be printed on a recording sheet and determining a shape and a printing position of a see-through preventing pattern corresponding to the image data to be printed.

2. Description of the Related Art

There may be the case in which, when a copied matter copied onto a white paper by a copier, which is one type of an image forming apparatus, is put in an envelope, the content of the copied matter can be seen through the envelope. Various methods have been used, such as a method of using an envelope that is specially processed, a method of using a thick paper, a method of using a special paper having special pattern on the back surface thereof, a method of printing the whole back surface of a general recording sheet solid with ink or toner, etc. in order to prevent the action of holding up the envelope against light to see the information in the envelope and enhance confidentiality of the copied matter.

For example, the Japanese Unexamined Patent Publication No. 2001-171264 discloses a overlapped adhesive sheet that employs a special sheet and in which the position of the see-through preventing printing is improved, in order to enhance the confidentiality of printed information and reduce sheet feeding trouble. The overlapped adhesive sheet is a concealed postcard folded in three having three sheets connected, wherein the see-through preventing printing is not performed on the second piece of sheet at the central part, but the see-through preventing printing is performed on the back surface, which is not the surface on which the information is printed, of the first and third pieces of sheets at both sides, in order to achieve enhancement of the confidentiality and reduction in the sheet feeding trouble.

However, in the method of using a special envelope or sheet, the degree of freedom of selecting an envelope or sheet is reduced. Further, since the cost of the envelope or sheet itself is expensive, this method leads to increased cost. In the method of printing the whole back surface of a general sheet solid, ink or toner is consumed in an amount greater than the amount used for printing on the front surface, and further, the deterioration of the consumables in the printing apparatus is accelerated, so that the maintenance cost is increased. In the method of printing the whole back surface solid with ink or toner, the resistance between a sheet feed roller and the sheet is increased after the printing on the back surface, which causes a paper jamming due to the sheet wound around the roller.

The sheet disclosed in the Japanese Unexamined Patent Publication No. 2001-171264 is effective for the special sheet that is the sheet folded in three, and it is difficult to adopt this method to a standard white sheet of A4 size. When an A4 sheet is put in an envelope without being folded, it is unclear which position on the back surface of the A4 sheet the see-through preventing printing should be performed, with the result that the position and shape (size) of the see-through preventing printing for reducing the sheet feeding trouble cannot be determined.

SUMMARY OF THE INVENTION

The present invention provides an image forming apparatus including: an image data reading section that reads image data formed on a document; an image processing section that separates regions where effective information is present from the read image data so as to determine, for every separated region, a shape of a see-through preventing pattern and a position at which the see-through preventing pattern is formed; an image printing section that prints the determined see-through preventing pattern at a part on a back surface of a recording sheet on which the document is printed, on the basis of the information of the determined position at which the see-through preventing pattern is formed, the part corresponding to any of the regions where the effective information of the document is present.

Since the see-through preventing pattern is printed only at the region of the recording sheet corresponding to the region where effective information of the document is present, sufficient confidentiality is secured regardless of the type of the recording sheet, i.e., even if a commercially available sheet is used, the amount of toner used for printing the see-through preventing pattern can be saved, the deterioration of the consumables can be prevented, and the sheet feeding trouble can be reduced.

DESCRIPTION OF THE PREFERRED EMBODIMENTS

Figure 1:
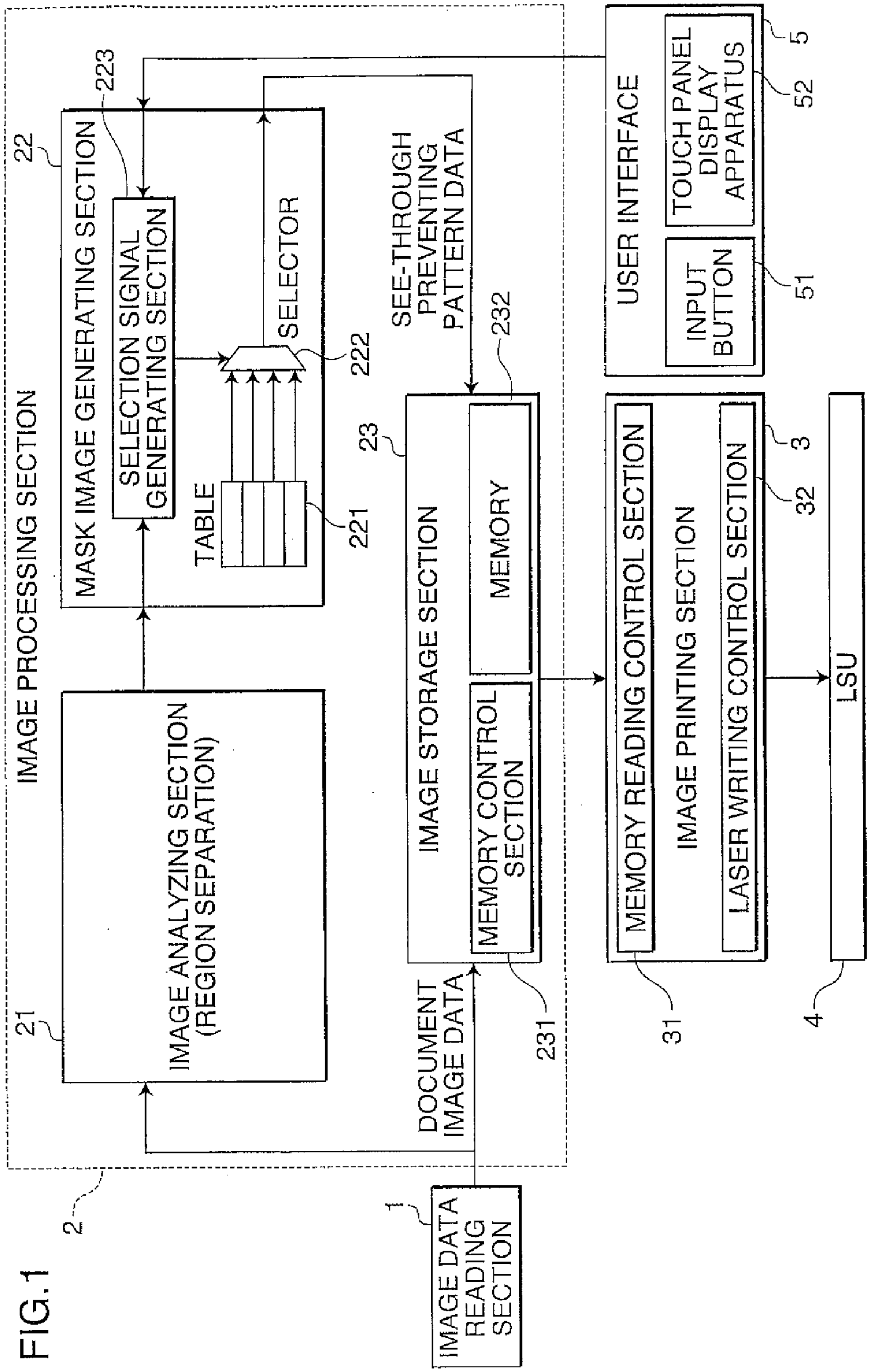
FIG. 1 is a block diagram showing a configuration of an image forming apparatus according to one embodiment of the present invention.

The present invention provides an image forming apparatus that has sufficient confidentiality even if a commercially available sheet is used and a special envelope or sheet is not used, can save toner to be consumed, can prevent the deterioration of consumables, and can minimize the sheet feeding trouble.

The present invention is accomplished by paying attention to the fact that document data printed by a digital copier is printed after being subject to an image process for the printing, and provides an image forming apparatus mainly including an image analyzing section that generates analyzing data of image information by performing a region separating process for separating a character print region and image print region of document data; and a mask image generating section that determines a shape and printing position of a see-through preventing pattern that is printed on the back surface, which is reverse to the printing surface of the document data, on the basis of the analyzing data.

Further, in the present invention, the image processing section has an image analyzing section that generates analyzing data by which the information type of the region having the effective information present therein can be identified for every pixel from the read image data, and a mask image generating section that converts the analyzing data into a basic pattern for generating the see-through preventing pattern that is associated with the information type beforehand so as to determine the shape of the see-through preventing pattern for every separated region, and determines the region where the analyzing data, of the generated analyzing data pieces, indicating a specific information type is present as the region where the see-through preventing pattern is formed.

By virtue of this, the see-through preventing pattern corresponding to the information type of the region having the effective information present therein can be printed for every region, whereby sufficient confidentiality can be secured.

Moreover, in the present invention, the analyzing data is represented by a numerical value indicating an information type that identifies at least a region where a character is present, a region where an image is present, and a background region where neither character nor image is present.

Still further, the mask image generating section determines the region where the analyzing data, which has a numerical value different from the value of the information type indicating the background region, is present as a region to be concealed where the see-through preventing pattern is formed, and the image printing section prints the see-through preventing pattern on the region to be concealed.

By virtue of this, the region other than the background region is defined as the region to be concealed, and the see-through preventing pattern is printed on the region to be concealed, whereby sufficient confidentiality can be secured, toner can be saved, and sheet feeding trouble can be reduced.

The present invention is also characterized in that the mask image generating section thins the analyzing data considering the pixel size of the basic pattern set beforehand, when converting the analyzing data into the basic pattern for generating the see-through preventing pattern, converts the thinned analyzing data into the basic pattern for generating the see-through preventing pattern, and determines the shape of the see-through preventing pattern having the size corresponding to the size of the region where the effective information of the original document is present.

By virtue of this, the see-through preventing pattern and the region having the effective information present therein can be matched, whereby the see-through preventing pattern having the required minimum size for securing the confidentiality can be generated.

Further, the image printing section generates a mirror image pattern of the see-through preventing pattern determined at the mask image generating section, and prints by utilizing the mirror image pattern.

By virtue of this, the see-through preventing pattern can be printed at the position on the back surface of the recording sheet corresponding to the region having the effective information present therein.

Moreover, the image forming apparatus further includes an input section that inputs selection information for selecting, among the regions where the effective information is present, the region that should be defined as the region to be concealed, and the image printing section prints the see-through preventing pattern on the selected region to be concealed according to the inputted selection information.

Still further, the inputted selection information is given to the mask image generating section, and the mask image generating section determines the region where the analyzing data, having the information type agreeing with the given selection information, is present as the region to be concealed.

By virtue of this, when a user inputs desired selection information from an input section, only the region intended by the user and having specific information present therein, such as a character region or image region, among the information pieces recorded on the document beforehand, is selected as the region to be concealed, and the see-through preventing pattern can be printed on the region to be concealed. Specifically, the user can control, of his/her own will, the position where the see-through preventing pattern is printed.

Moreover, the mask image generating section has a table that stores beforehand the basic pattern for generating the see-through preventing pattern associated with the information type, and the table is composed of a nonvolatile rewritable storage device. For example, an EPROM or flash memory can be employed.

Since a non-volatile rewritable storage device is used as a table, the basic pattern specified beforehand can be stored semipermanently, and a basic pattern newly specified by a user can be added, or the basic pattern can be changed or deleted.

The present invention also provides an image forming method of an image forming apparatus including: an image data reading step of reading image data formed on a document; an image processing step of separating regions where effective information is present from the read image date, so as to determine, for every separated region, a shape of a see-through preventing pattern and a position at which the see-through preventing pattern is formed; and an image printing step of printing the determined see-through preventing pattern at a part on a back surface of a recording sheet on which the document is printed, on the basis of the information of the determined position at which the see-through preventing pattern is formed, the part corresponding to any of the regions where the effective information of the document is present.

An embodiment of the present invention will be described with reference to the drawings. It is to be noted that the description of the embodiment below is not limitative of the present invention.

<Configuration of Image Forming Apparatus>

FIG. 1 is a block diagram showing a configuration of an image forming apparatus according to one embodiment of the present invention.

The image forming apparatus shown in FIG. 1 is a multifunction periphery including a function of a section (3, 4) corresponding to a printer that is connected to a computer and forms an image on the basis of image data inputted from the computer, and a function of a section (1, 2) corresponding to a copier (scanner) that reads the image data formed on a document.

The image forming apparatus is configured to mainly include an image data reading section 1 that reads image data formed on a document, an image processing section 2 that performs an image processing to the image data read by the image data reading section 1 and stores the resultant into an image storage section 23, an image printing section 3 that reads the image data from the image storage section 23 and forms an image onto a recording sheet, and a user interface (input section) 5 that inputs information for the image processing.

A scanner including a document placing section on which, for example, a document having an image formed thereon beforehand is placed, and an optical scanning section that optically scans the image on the document placed onto the document placing section for reading the image data can be employed as the image data reading section 1. The image data read by the image data reading section 1 is transferred to an image analyzing section 21 of the image processing section 2, where a region separating process described later is performed. It is preferable that the document image data is also stored in the image storage section 23 of the image processing section 2 due to the reason described below.

The image data formed on the document includes not only so-called image information such as a diagram, graph, photograph, etc., but also character information and signal information such as alphabet, numeral, kanji-character, etc.

Specifically, a character is handled as one image data piece after the reading.

The image processing section 2 is mainly composed of the image analyzing section 21, a mask image generating section 22, and the image storage section 23.

The image processing section 2 separates a region where effective information of the read image data is present, and determines a shape of a see-through pattern and a formation position of the see-through preventing pattern for every separated region.

The region where the effective information is present means the region where a character, signal, diagram, graph, photograph, or the like is present. Specifically, it means the region where information that can be visually recognized is present. In the region where the effective information is present, a region where a great number of character strings are mainly written is referred to as a character region, while a region where a diagram or photograph is printed is referred to as an image region.

A document portion that is left with the color same as the color of the recording sheet, i.e., a portion where the effective information such as a character and image is not present, is referred to as a background region. The character region and the image region are defined as a region to be concealed, and the background region is a region not to be concealed.

The image analyzing section 21 performs the region separating process to the image data read by the image reading section 1, and generates analyzing data that indicates a type of the information of the image data (e.g., character region, image region) for every one pixel.

The type of the information means the type of the information included mainly in the region separated by the region separating process, and it is indicated by a numerical value as described later. For example, the character region where the character information is mainly present is represented by "1".

The analyzing data is data, for every pixel, that can identify which information type the region where the effective information is present has. It is represented by a numerical value (information type value) indicating the information type that identifies at least the region where a character is present, the region where the image is present, and the background region. For example, the analyzing data of each pixel belonging to the character region is represented by "1".

The mask image generating section 22 selects the shape of the see-through preventing pattern and determines the arrangement position of the pattern on the basis of the analyzing data generated by the image analyzing section 21, so as to generate the see-through preventing pattern.

The shape of the see-through preventing pattern is determined as a set of basic patterns for generating the see-through preventing pattern (hereinafter sometimes referred to as a basic pattern) associated with the respective information types beforehand.

The basic pattern is defined beforehand for every numerical value of the information types. The generated analyzing data is converted into the basic pattern associated with the numerical value (information type) of the analyzing data.

In the generated analyzing data, a region where the analyzing data indicating a specific information type, such as the character region or image region, is determined as a formation region of the see-through preventing pattern. In other words, in principle, the see-through preventing pattern is formed on the region where the effective information such as the character information is present. It is to be noted that, as described later, the see-through pattern is not formed on the region that is defined as the region not to be concealed, even if this region has the effective information present therein.

The region where the analyzing data having a numerical value different from the information type value indicating the background region is present is referred to as a region to be concealed on which the see-through preventing pattern should be formed.

The image printing section prints the see-through preventing pattern on the region to be concealed.

The image storage section 23 stores the see-through preventing pattern generated at the mask image generating section 22 and the image data of the document read by the image reading section 1.

The image analyzing section 21 determines, for ever pixel of the image data, whether a pixel of interest is included in the character region, included in the image region, or included in the other region, from the correlation between the density information of the pixel of interest and plural pixels adjacent to the pixel of interest, thereby generating numerically-expressed information, indicating which region the pixel is contained, as analyzing data for every pixel. As a result, the document is separated into some regions to be concealed.

The mask image generating section 22 is mainly composed of a table 221, a selector 222, and a selection signal generating section 223.

The table 221 is a section storing a basic pattern that is the minimum constituent data piece of the see-through preventing pattern. The selector 222 is a section selecting the shape of the see-through preventing pattern by referring to the basic pattern in the table on the basis of the analyzing data generated by the image analyzing section 21.

Selection information that indicates which separating region should be defined as the region to be concealed is inputted from the later-described user interface 5. The selection signal generating section 223 generates a selection signal for allocating the see-through preventing pattern only to the region that should be concealed. The selection signal is given to the selector 222 so as to determine the position where the see-through preventing pattern should be arranged and the basic pattern that should be selected. The selection signal is equivalent to the analyzing data in principle. The analyzing data contained in the region that is not defined as the region to be concealed is converted into another data beforehand and given to the selector 222.

The selector 222 generates the see-through preventing pattern that is printed on the backside of the recording sheet, i.e., on the surface reverse to the surface on which the information is printed. Thus, the shape and the position of the see-through preventing pattern are determined.

The selection signal generating section of the mask image generating section may perform a thinning process of the analyzing data before generating the selection signal. Particularly, when the shape of the basic pattern corresponding to the analyzing data for one pixel is defined by the size corresponding to the size of two or more pixels, the basic pattern should be selected so as to have the same size as the original document.

In this case, some analyzing data pieces are thinned considering the pixel size of the basic pattern set beforehand, upon converting the analyzing data into the basic pattern. The analyzing data after the thinning process is given to the selector, and only the analyzing data, which has been subject to the thinning process, is converted into the basic pattern for generating the see-through preventing pattern. This can determine the shape of the see-through preventing pattern having the size corresponding to the size of the region where the effective information of the original document is present.

The image storage section 23 is mainly composed of a memory 232 and a memory control section 231 that controls the memory 232. The memory 232 can employ a non-volatile storage device that stores the image data. For example, a random access memory (RAM) or flash memory may be employed. The see-through preventing pattern generated by the mask image generating section 22 and the image data read by the image data reading section 1 are stored in the memory 232 that is controlled by the memory control section 231.

The image storage section 23 is mainly utilized as a buffer for absorbing a speed difference between a reading speed of the image data reading section 1 and a printing speed of the image printing section 3. When there is no difference in both speeds or when the reading speed is surely faster than the printing speed, it is unnecessary to store the image data read by the image data reading section 1 into the image storage section 23. However, since the printing speed might be faster, by which the printing might overtake the reading of the document, the image data read by the image data reading section 1 is preferably stored in the image storage section 23.

The image printing section 3 is mainly composed of a memory reading control section 31 for reading image data, which is to be printed, from the image storage section 23, and a laser writing control section 32.

The laser writing control section 32 transfers the image data, read from the memory reading control section 31, to an LSU 4 at a suitable timing, and executes the control of the operation for forming an image onto a photosensitive drum, such as a charging control of the unillustrated photosensitive drum, a writing control of an electrostatic latent image by exposure means, a control involved with a developing of the electrostatic latent image, etc.

When the see-through preventing pattern, which should be printed on the region to be concealed, is read from the image storage section, the image printing section 3 reads the see-through preventing pattern as generating a mirror image pattern of the see-through preventing pattern determined by the mask image generating section. The see-through preventing pattern is printed on the backside of the recording sheet by utilizing the mirror image pattern.

The LSU 4 executes the control of the operation for transferring the image, formed on the photosensitive drum, onto the recording sheet, fixing the image transferred onto the recording sheet, or the like, based on operational instruction of the laser writing control section 32.

The user interface 5 corresponds to an input section that inputs an operational instruction or operational condition by an operator of the image forming apparatus. For example, the user interface 5 includes a keyboard and an input button 51 that is set so as to be capable of inputting various operational instructions, or a touch panel display device 52 composed of a liquid crystal display.

The user interface 5 is, in particular, utilized for inputting the selection information in order to select the region that should be defined as the region to be concealed in the region where the effective information is present.

The selection information is the information given to the mask image generating section, and given as the value corresponding to the numerical value indicating the information type. The mask image generating section uses the selection information for determining the region to be concealed. Specifically, the mask image generating section determines, as the region to be concealed, the region where the analyzing data, having the information type that agrees with the given selection information, is present.

<Outline of Process for Forming See-Through Preventing Pattern According to the Present Invention>

Figure 3:
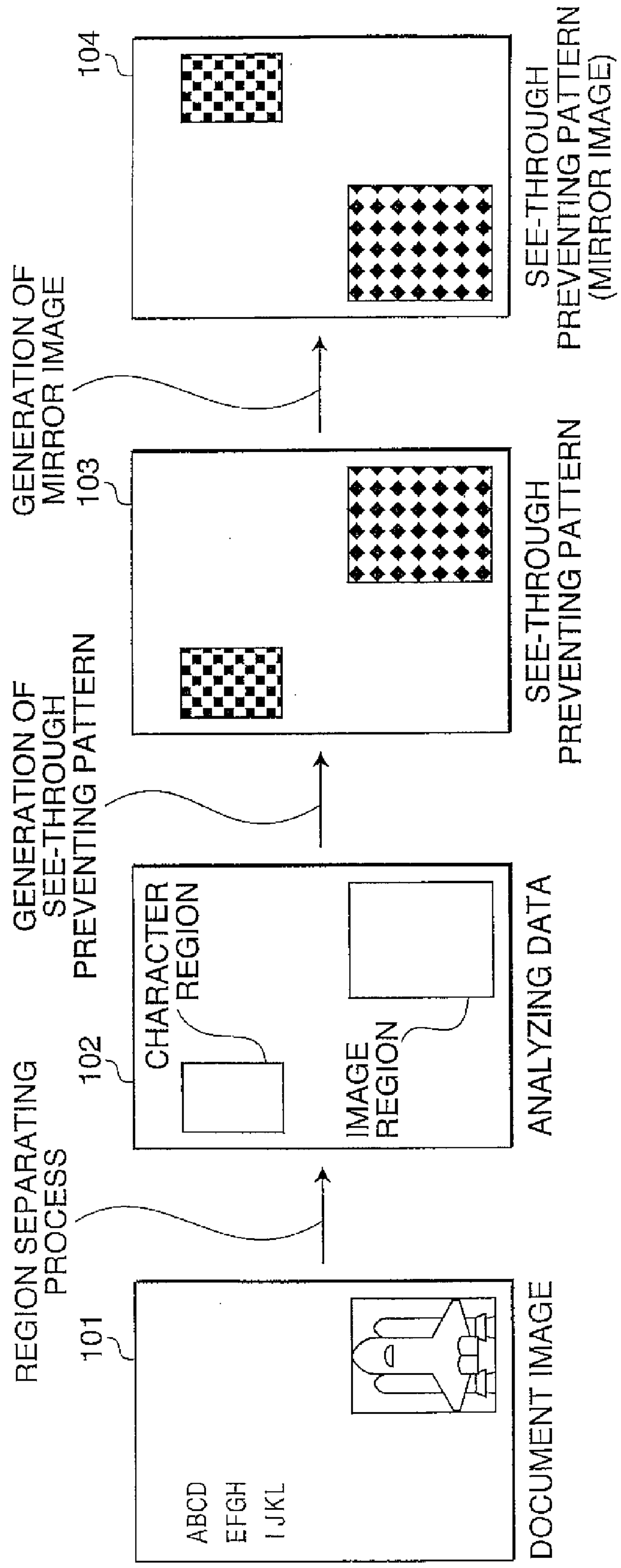
FIG. 3 is a schematic explanatory view of a process for forming the see-through preventing pattern according to the present invention.

FIG. 3 is a view for explaining an outline of a process for forming the see-through preventing pattern according to the present invention.

Firstly, the document image 101 in FIG. 3 is read by the image data reading section 1, and given to the image analyzing section 21. As described above, the image analyzing section 21 analyzes which region of the document has the effective information from the density information for every pixel, recognizes the character region or image region for every pixel, and separates the region. The analyzing data 102 is generated by this region separating process. The generated analyzing data 102 is given to the mask image generating section 22.

At the mask image generating section 22, the see-through preventing pattern 102 is generated at the position corresponding to the region (character region, image region) recognized as the region where the effective information is present. The see-through preventing pattern 103 is generated by arranging the basic pattern, corresponding to the numerical value of the analyzing data, to the position of the numerical value, while referring to the basic pattern stored in the table 221.

However, since the see-through preventing pattern is to be printed on the backside that is reverse to the surface on which the information of the document image is printed, the pattern 104 that is the mirror image pattern of the see-through preventing pattern 103 is generated. The mirror image pattern 104 is the actual pattern printed onto the backside of the sheet.

For example, the mirror image pattern 104 of the see-through preventing pattern 103 generated on the image region is to be printed on the backside of the document image 101 reverse to the surface on which the image data is printed.

As described above, the mirror image pattern of the see-through preventing pattern is printed at the position corresponding to the region where the effective information is present, whereby a sufficient confidentiality can be secured.

In general, it is rare that the region where the effective information is present is present all over the surface of the document, and some background regions might be present. Therefore, the see-through preventing pattern is not printed on the background region, whereby the toner amount used for printing the see-through preventing pattern can be reduced. Consequently, the deterioration of the consumables can be prevented, and the trouble upon feeding a sheet can be reduced.

<Explanation of Analyzing Data>

The analyzing data generated by the image analyzing section 21 will be explained.

As shown by 102 in FIG. 3, the analyzing data is the numerically-expressed data indicating the region where the information of a character and an image is present and the type of the information of the region in the document image 101, and retained as the numerical information corresponding to one pixel of the document image.

Figure 4:
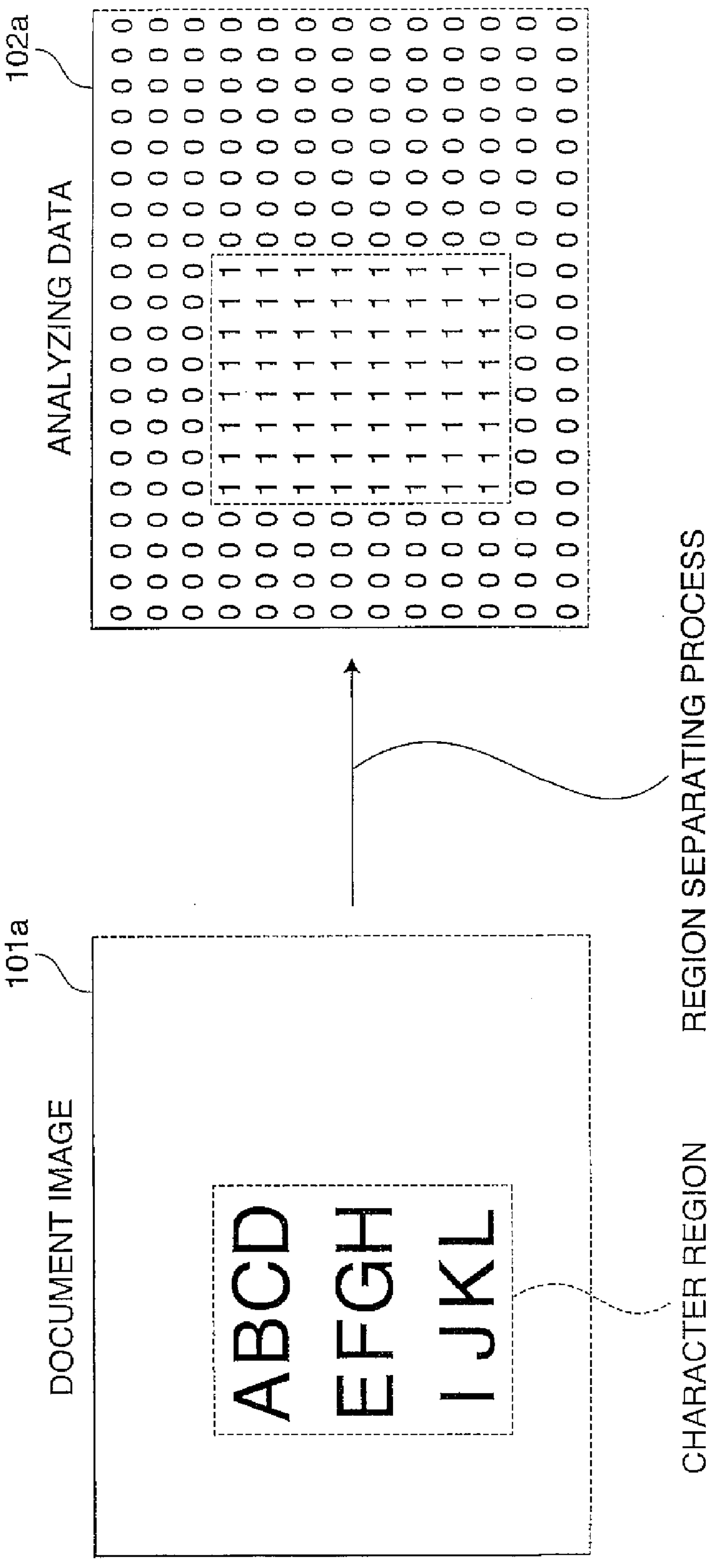
FIG. 4 is an explanatory view of a structure of analyzing data according to one embodiment of the present invention.

FIG. 4 shows a specific example of the analyzing data.

The analyzing data is the numerical information such as 102*a* in FIG. 4. Here, the background that is the portion having no character and image is indicated by 0, and the region where characters (A to L) are present is defined by 1. Further, the region where an image is present is indicated by 2, and the other region that cannot be determined as the character region and the image region is indicated by 3.

<Explanation of Basic Pattern in Table>

Figure 5:
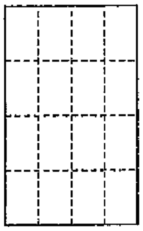
FIG. 5 is an explanatory view of a basic pattern stored in a table according to one embodiment of the present invention.
Figure 5:
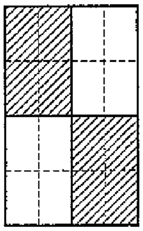
Figure 5:
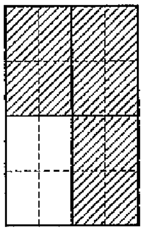
Figure 5:
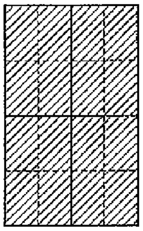

FIG. 5 shows one example of the basic patterns of the see-through preventing pattern stored in the table 221.

FIG. 5 shows pattern shapes 105 of four basic patterns defined as associated with four analyzing data pieces (0, 1, 2, 3).

For example, the analyzing data 0 (background) means that the entire surface has a white pattern, and the see-through preventing pattern is not printed on this position. A pattern in which basic rectangular portions at the upper-left part and the lower-right part are formed as black patterns is used for the analyzing data 1 (character). A pattern in which three regions are formed into black patterns is used for the analyzing data 2 (image). A black solid pattern is used for the analyzing data 3 (other).

The basic pattern corresponding to the analyzing data for every pixel is selected, while referring to such four basic patterns, in order to determine the position where the see-through preventing pattern is arranged and the shape of the see-through preventing pattern.

As describe above, by using the basic pattern different depending upon the numerical value of the information type of the analyzing data, the suitable see-through preventing pattern can be formed for every region where the effective information is present, whereby an effective confidentiality corresponding to the information type is possible. For example, the character portion having less information can be concealed by the pattern having relatively less black portions, while the image region having a lot of information can be difficult to be seen by using the pattern having relatively a lot of black portions.

<Explanation of Generation of See-Through Preventing Pattern and Thinning Process>

Next, the generation of the see-through preventing pattern and the thinning process will be explained.

The selector 222 of the mask image generating section 22 selects the basic pattern of the corresponding see-through preventing pattern stored in the table 221 according to the numerical value (background 0, character region 1, image region 2, other region 3) indicated by the analyzing data (selector signal) generated at the image analyzing section 21. Thus, the analyzing data is converted into the basic pattern.

Figure 6:
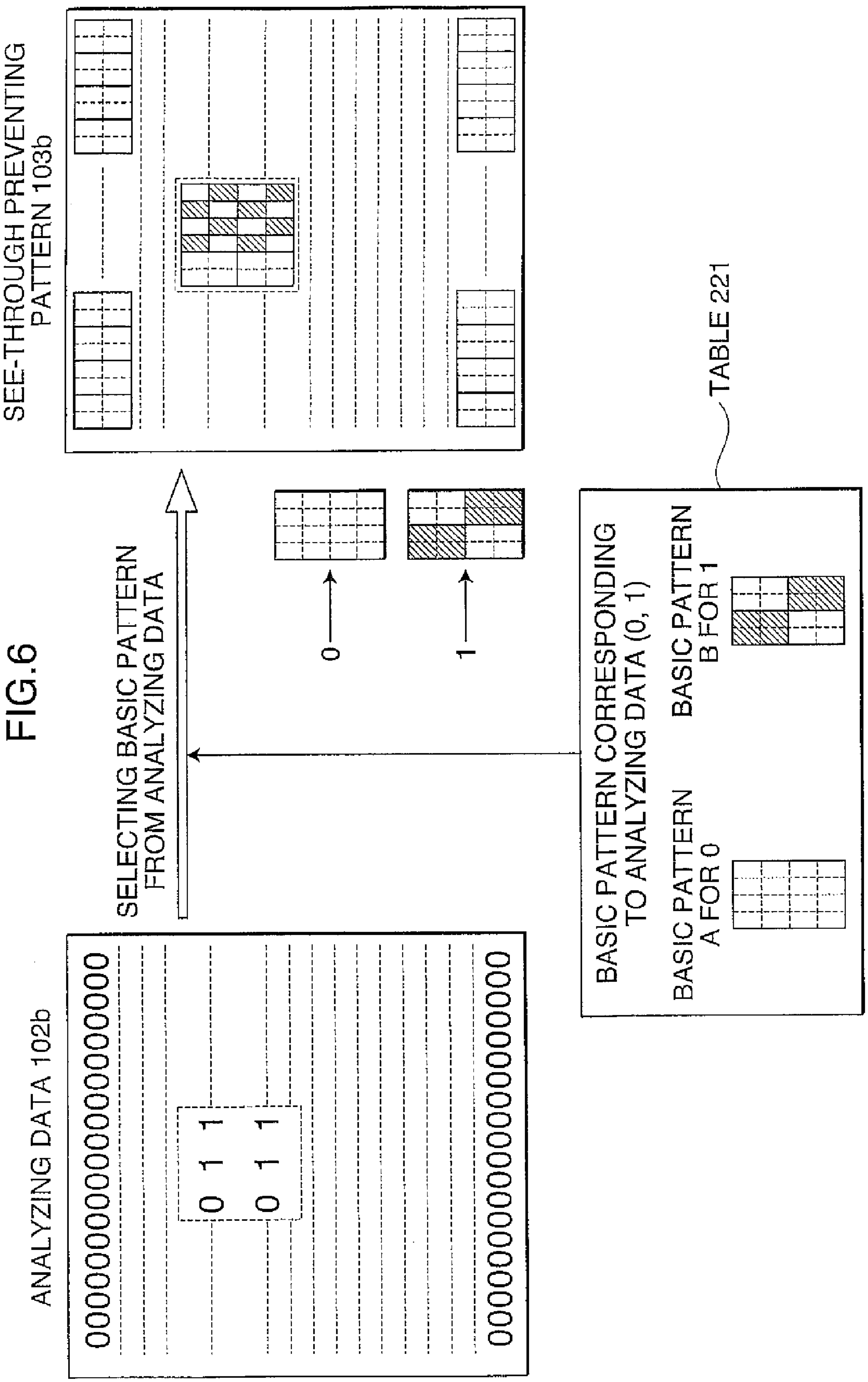
FIG. 6 is an explanatory view showing a process for forming the see-through preventing pattern from the analyzing data and the basic pattern.

FIG. 6 shows one embodiment of a process of selecting the basic pattern in the table from the analyzing data.

Here, attention is put on only six analyzing data pieces in the region enclosed by the dotted line in a great number of analyzing data pieces 102*b* in the diagram at the left side. It is supposed that the thinning process described later is not considered. It is supposed that the analyzing data pieces 0 and 1 are present in the region enclosed by the dotted line.

Since the table 221 includes the basic pattern A corresponding to the analyzing data 0 and the basic pattern B corresponding to the analyzing data 1, the corresponding pattern A is selected for the analyzing data 0 in the region enclosed by the dotted line, and the basic pattern A is arranged at the position of the analyzing data 0.

The corresponding basic pattern B is selected for the analyzing data 1 in the region enclosed by the dotted line, and the basic pattern B is arranged at the position of the analyzing data 1. Thus, six analyzing data pieces 102*b* in the region enclosed by the dotted line in FIG. 6 becomes the see-through preventing pattern 103*b* composed of six basic patterns illustrated in the diagram at the right side.

Meanwhile, the basic pattern 105 is composed of plural pixels. If the basic pattern 105 is a rectangular image data piece made of four pixels×four pixels (length×breadth), the data size after it is converted into the basic pattern increases. For example, when one pixel of the analyzing data generated at the image analyzing section 21 is simply replaced by the shape of the basic pattern 105 of four pixels×four pixels, the image data having the size enlarged sixteen times as a whole is formed, wherein the length and the breadth are respectively enlarged four times. The see-through preventing pattern cannot be printed on the desired position with this image data. Therefore, the thinning process for deleting some data pieces is performed.

Figure 8:
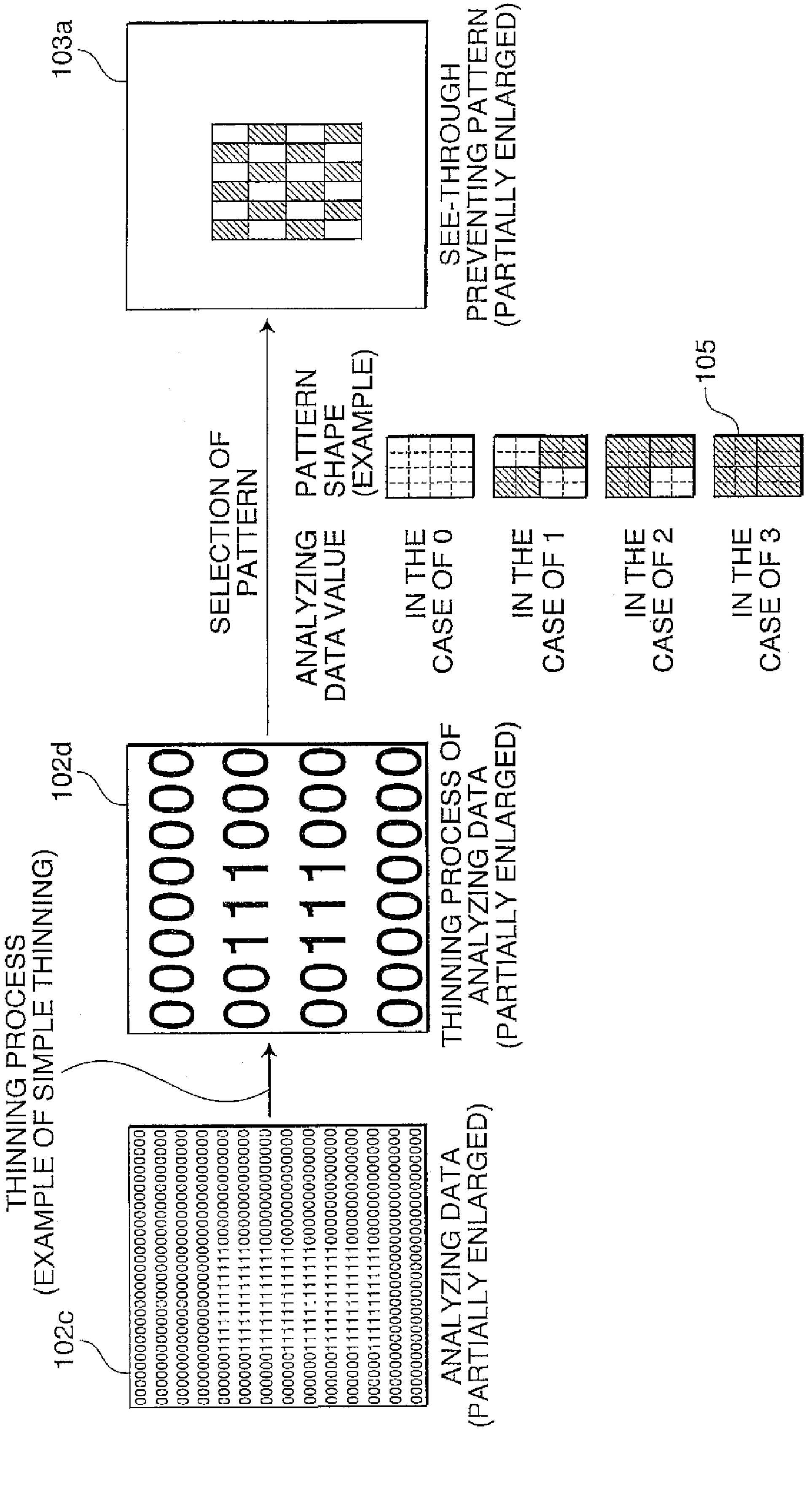
FIG. 8 is an explanatory view showing a process for determining the see-through preventing pattern from the analyzing data according to one embodiment.

For example, analyzing data 102C generated at the image analyzing section 21 is subject to the thinning process by the selection signal generating section 223 such that the pixels in the lateral direction are thinned out every four pixels and the lines in the longitudinal direction are thinned out every four lines as shown in FIG. 8. Thus, the analyzing data (selector signal) given to the selector 222 is thinned out by the necessary number, so that the see-through preventing pattern having the size equal to the document size can be generated at the position corresponding to the character region of the original document.

Figure 7A:
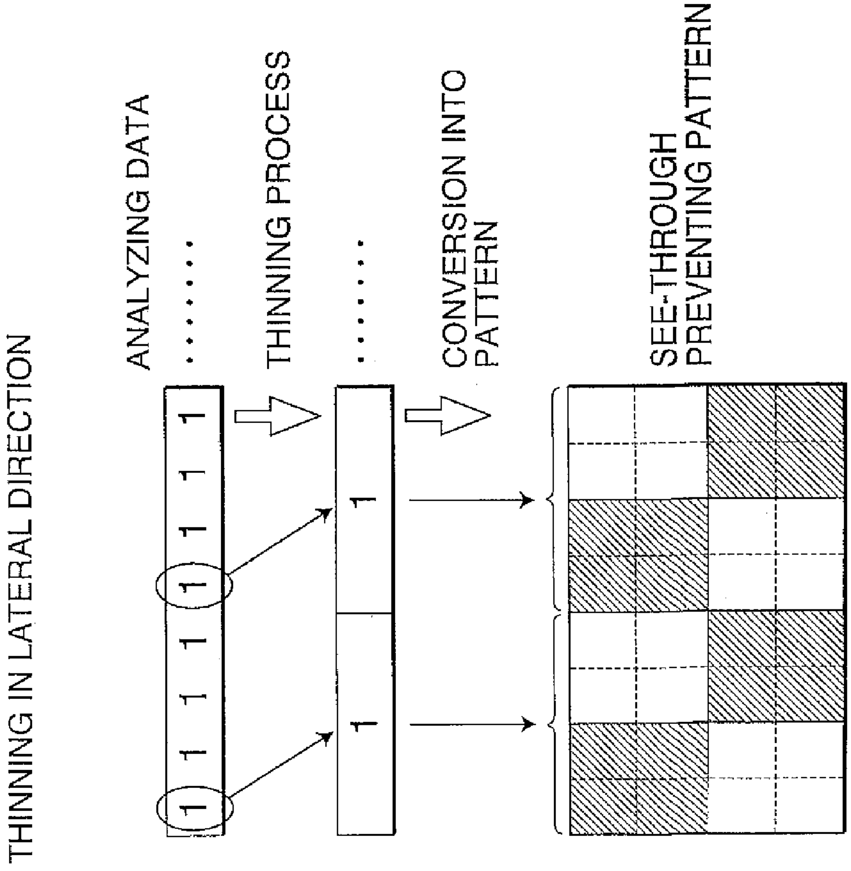
FIGS. 7A and 7B are explanatory views showing a thinning process of the analyzing data according to one embodiment of the present invention.
Figure 7B:
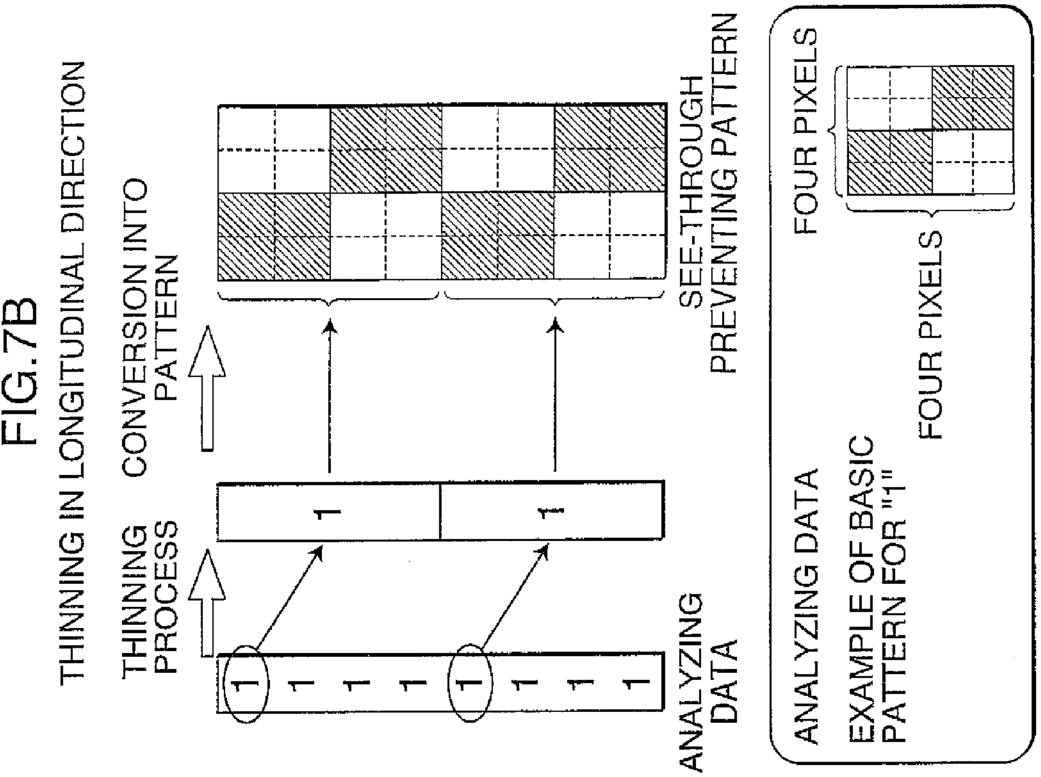

FIGS. 7A and 7B are views schematically explaining one example of the thinning process according to the present invention.

FIG. 7A shows the thinning process for the analyzing data in the lateral direction.

Attention is put on only one line in the lateral direction, and it is supposed that eight analyzing data pieces "1" corresponding to eight pixels are arranged. In this case, only the first and fifth analyzing data pieces from the left are left, and the other six analyzing data pieces are deleted. By this process, the eight analyzing data pieces are thinned out to be two analyzing data pieces "1".

Thereafter, the process for selecting the basic pattern is executed for the two analyzing data pieces "1" after the thinning process. In this case, one analyzing data piece "1" is converted into the corresponding basic pattern (four pixels×four pixels), with the result that the portion of the original eight analyzing data pieces is converted into the see-through preventing pattern shown in FIG. 7A in which the two basic patterns are arranged side by side. Thus, the see-through preventing pattern having eight pixels having the same size is formed in the lateral direction so as to correspond to the analyzing data pieces for eight pixels arranged in the lateral direction.

FIG. 7B shows the thinning process of the analyzing data in the longitudinal direction. Attention is put only on one line in the longitudinal direction, and it is supposed that eight analyzing data pieces "1" corresponding to eight pixels are arranged. In this case, the thinning process is carried out in the same manner as in FIG. 7A.

Specifically, only the first and fifth analyzing data pieces from the upper side are left, and the other six analyzing data pieces are deleted.

Thereafter, the process for selecting the basic pattern is executed for the two analyzing data pieces "1" after the thinning process. Accordingly, the see-through preventing pattern made of two basic patterns (four pixels×four pixels) arranged in the longitudinal direction is formed. Thus, the see-through preventing pattern having eight pixels having the same size is formed in the longitudinal direction so as to correspond to the analyzing data pieces for eight pixels.

<Determination of Region to be Concealed>

The regions (character region, image region, etc.) printed in the document and having the effective information present therein are recognized by the region separating process, and these regions are identified by the numerical value of the generated analyzing data.

When confidential information is described on all recognized regions as described above, all of the recognized regions are defined as the subject to be concealed, and the see-through preventing pattern may be formed on these regions.

However, the confidential information is not always described in all regions having information present therein. For example, there is a region where information, which may be known by a third party, such as an advertisement, design of a manuscript paper, or the like, is present. These regions are not defined as the subject to be concealed in some cases.

It is considered that the see-though preventing pattern is unnecessarily formed on the position of the back surface corresponding to the region that does not need to be defined as the subject to be concealed.

Specifically, the see-through preventing pattern is not formed on the region not to be concealed, whereby the consumed toner is saved and the deterioration of the consumables can be prevented. Further, since the pattern printed on the back surface is reduced, the sheet feeding trouble can be minimized.

The selection signal generating section 223 determines whether or not the region (separated region) having information present therein and identified by the generated analyzing data is defined as the subject to be concealed. The determination for the region to be concealed is carried out by using the selection information given from the user interface 5.

The selection information is the information indicating which separated region should be defined as the region to be concealed. The selection information is set by a user who employs the user interface 5 of his/her own will. For example, when the user inputs the numerical value (1, 2 or 3) of the region that the user intends to define as the region to be concealed, this numerical value is set to the selection information.

This selection information is given to the selection signal generating section 223 from the user interface 5 as the numerical value of the analyzing data that should be defined as the region to be concealed. The selection signal generating section 223 gives the analyzing data, having the numerical value same as that of the given selection information, to the selector 222 as the selection signal.

On the other hand, the analyzing data having the numerical value different from that of the selection information is the data corresponding to the region that should not be concealed, so that it is replaced by 0, which is the same as the one indicating the background region, and given to the selector 222. The position of the analyzing data having 0 that is the same as the one indicating the background region is handled as the position where the see-through preventing pattern is not printed upon the printing process by the image printing section 3. Thus, even the region where effective information is present is separated into the region to be concealed and the region not to be concealed by the selection information given from the user interface 5.

Since the see-through preventing pattern is not printed on the back surface corresponding to the region not to be concealed, toner can be saved, the deterioration of consumables can be prevented, and sheet feeding trouble can be reduced.

<Process of Generating Mirror Image Pattern>

When the see-through preventing pattern 103 shown in FIG. 3 and generated at the mask image generating section 22 is printed on the back surface of the recording sheet as unchanged, the see-through preventing pattern is printed at the position exactly opposite to the position, in the lateral direction, on the front surface where the information is present. Therefore, the mirror image pattern 104 shown in FIG. 3 should be generated in order to print the see-through preventing pattern on the back surface corresponding to the position on the front surface where the information is present.

In view of this, the memory reading control section 31 of the image printing section 3 reads the see-through preventing pattern from the memory 232 as performing the mirror image process for generating the mirror image pattern.

The mirror image process may be performed in such a manner that the see-through preventing pattern is read from the trailing end in the lateral direction as described later. Thus, the mirror image pattern 104 is generated.

The formation of the mirror image pattern 104 makes it possible to match the position on the front surface where the information is present and the position where the see-through preventing pattern is printed.

The mirror image pattern 104 of the see-through preventing pattern generated as described above is printed on the back surface of the recording sheet, on which the document image is copied, by the LSU 4, whereby a countermeasure to a menace in which an envelope having information of a document put therein is held up against light can be realized.

One Embodiment of Printing Process of See-Through Preventing Pattern

A process flow for printing the see-through preventing pattern will be explained here.

Figure 2:
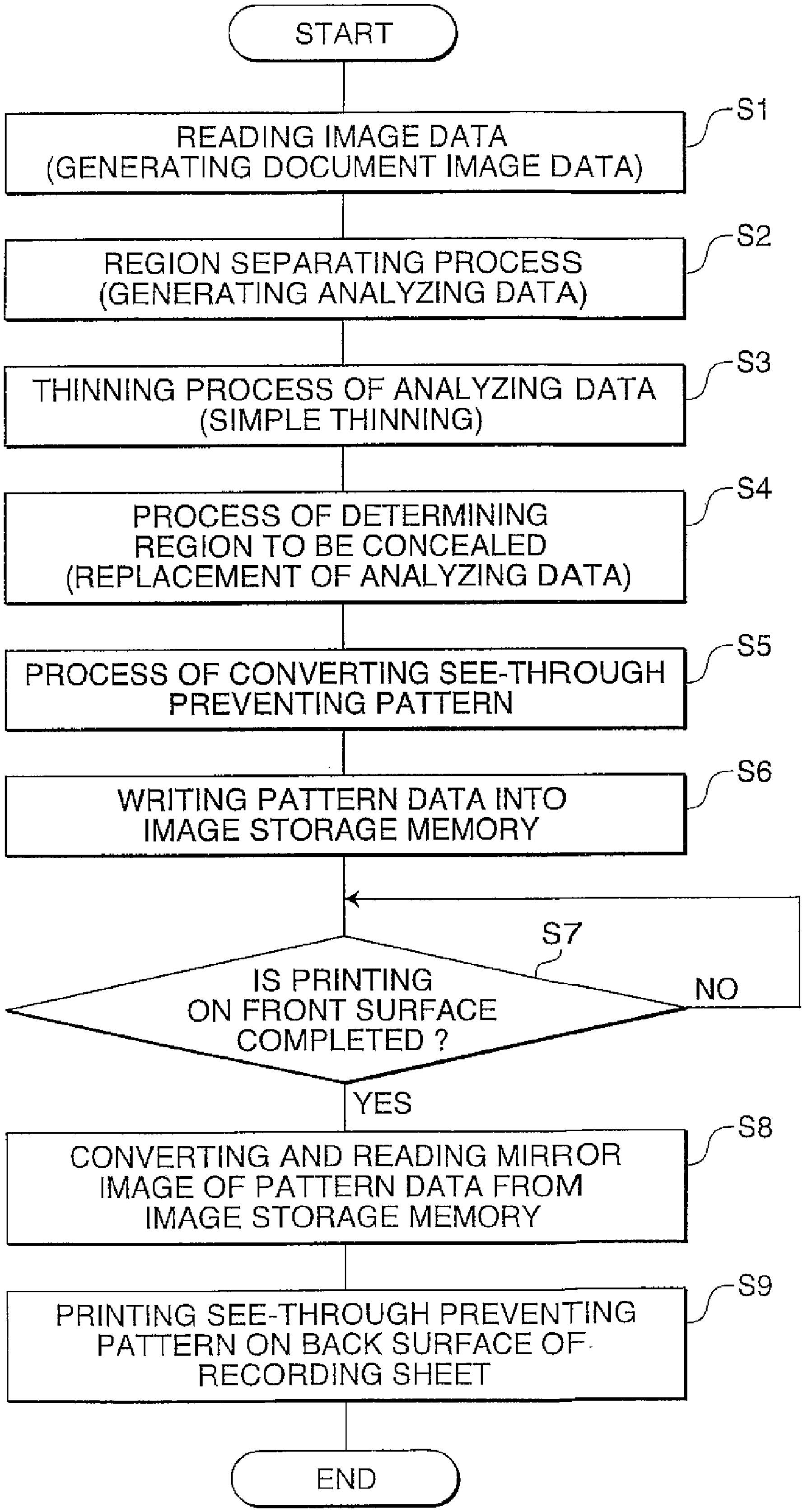
FIG. 2 is a schematic flowchart showing a printing process of a see-through preventing pattern according to one embodiment of the present invention.

FIG. 2 shows a schematic flowchart of one embodiment of the printing process according to the present invention.

Firstly, at step s1, image data is read by the image data reading section 1 from the document 101 having information already recorded thereon. Accordingly, numerically-expressed document image data having density information is generated, which is given to the image analyzing section 21 and stored in the memory 232 of the image storing section 23.

Next, at step s2, the image analyzing section 21 performs the region separating process to the document image data generated at the step s1. The region separating process may be performed by using the density information of the adjacent pixels as described above, but the separating process disclosed in Japanese Unexamined Patent Application No. HEI10-4482 may be utilized. By this region separating process, the analyzing data 102, which is one-to-one correspondence to a pixel of the document image data generated at the step s1, is generated.

The analyzing data is generated as described below, for example.

When it is determined by the region separating process that a certain pixel is a pixel at the background portion where information is not present, a numerical value of 0 is allocated to this pixel. A numerical value of 1 is allocated to the pixel that is determined to be character information, a numerical value 2 is allocated to the pixel that is determined to be image information such as a photograph or drawing, and a numerical value of 3 is allocated to the pixel that is determined to the other information such as noise or ruled lines. In this case, the numerically-expressed analyzing data indicates four information types, so that it may be stored as 2-bit information per one pixel.

Next, at step s3, the selection signal generating section 223 performs the thinning process to the analyzing data generated at the step s2. A simple thinning process may be carried out in such a manner that the analyzing data is acquired every four pixels slidingly and every four lines longitudinally, and the other data pieces are deleted. According to this thinning process, the amount of the analyzing data is 1/16 the original data amount.

Next, at step s4, it is determined whether or not the value (any one of 1, 2 and 3) indicated by the analyzing data generated as thinned out at the step s3 agrees with the value of the subject to be concealed that is desired by an operator of the image forming apparatus. Specifically, the process for determining the region to be concealed is carried out. The selection signal generating section 223 also performs this process.

The value of the subject to be concealed desired by the operator of the image forming apparatus corresponds to the above-mentioned selection information. If it is the character information, the value is set as 1, if it is the image information, the value is set as 2, and if it is the other information, the value is set as 3, by the user interface 5 beforehand.

In the determining process at the step s4, the numerical value of the analyzing data and the numerical value set by the user interface 5 are compared. If they agree with each other, the value of the analyzing data is outputted as unchanged, and if they do not agree with each other, it is replaced by 0, which indicates the background, and outputted. The outputted numerical value corresponds to the selection signal described above. With this process, the region to be concealed that is desired by the operator is extracted, whereby the region on which the see-through preventing pattern should be printed is specified.

The outputted selection signal is given to the selector 222.

Next, at step s5, the process for converting the analyzing data into the see-through preventing pattern is performed.

Here, the shape 105 of the basic pattern corresponding to the numerical information indicated by the analyzing data outputted at the step s4 is selected from the table 221 that stores the basic patterns, which are the minimum constituent data piece of the shape of the see-through preventing pattern, and the analyzing data is converted into the pattern shape 105.

It is considered that the position where the numerical value indicated by the analyzing data outputted at the step s4 is 0 does not need the see-through preventing pattern. Therefore, the pattern shape is not selected from the table, while the pattern data (document image data) having the color same as the color of the background is outputted. Accordingly, only the position where the numerical value of the analyzing data (selection signal) given to the selector 222 is 1, 2 or 3 is converted into the corresponding pattern shape 105. The basic pattern 105, which is the minimum constituent data piece of the shape of the see-through preventing pattern, is image data having four pixels in the lateral direction and four pixels in the longitudinal direction and having black and white mixedly present, or having a density value and composed only of black pixels, as shown in FIG. 5.

Next, at step s6, the data of the shape of the see-through preventing pattern selected and outputted at the step s5 is written in the memory 232.

Next, at step s7, it is checked whether or not the printing to the front surface of the document having information recorded thereon is completed. When the printing is not completed, the check at the step s7 is repeated. After the printing on the front surface is completed, the program proceeds to step s8 where the printing of the see-through preventing pattern on the back surface is started.

Next, at step s8, the data of the shape of the see-through preventing pattern recorded in the memory at the step s6 is read, while performing the mirror image process. The mirror image process may be performed in such a manner that the data of the shape is read from the trailing end of each line in the reverse order. With this mirror image process, the data of the shape of the see-through preventing pattern recorded in the memory at the step s6 becomes the mirror image pattern in which the data of the shape of the see-through preventing pattern is laterally reversed as shown by the pattern 104 in FIG. 3.

Next, at step s9, the see-through preventing pattern is printed on the back surface of the recording sheet by using the mirror image pattern 104 of the read see-through preventing pattern.

By the execution of the process described above, the see-through preventing pattern is printed on the position that needs to be confidential. Accordingly, satisfactory confidentiality can be secured, the amount of toner can be saved, and sheet feeding trouble can be reduced.

According to the present invention, the see-through preventing pattern is printed on the back surface, which is reverse to the printing surface of the document image, upon the copy of a copier, so that a use of a sheet specially processed for see-through prevention is not needed.

Since the see-through preventing pattern is printed only at the back surface of the recording sheet corresponding to the region of the document having the effective information present therein, sufficient confidentiality can be secured.

It is rare that the region having the effective information present therein is present all over the document. Therefore, the see-through preventing pattern is printed only on a part of the back surface of the recording sheet. Accordingly, an amount of toner to be consumed can be saved, the deterioration of consumables such as a photosensitive drum can be prevented, and a maintenance cost can be saved.

Since the region to be concealed on which the see-through preventing pattern is printed can be selected by the input section, a user can control, of his/her own will, the position to be concealed.

Since the see-through preventing pattern is printed only on a required region on the back surface, the change in the friction resistance of the sheet can be reduced, and the sheet feeding trouble can be reduced, compared to the case in which the see-through preventing pattern is printed all over the back surface.

What is claimed is:

1. An image forming apparatus comprising, an image data reading section that reads image data formed on a document, an image processing section configured to separate regions where effective information is present from the read image data so as to determine, for every separated region, a shape of a see-through prevention pattern and a position at which the see-through prevention pattern is to be formed;

an image printing section that prints the see-through prevention pattern only at a corresponding part on a back surface of a recording sheet on which the document is printed, on the basis of the determined shape and position of the see-through prevention pattern, the corresponding part corresponding to any of the regions where the effective information of the document is present, wherein the see-through prevention pattern prevents, when printed on the back surface of the recording sheets, the effective information printed on the front surface from being seen when the recording sheet is transilluminated.

2. The image forming apparatus according to claim 1, wherein the image processing section comprises, an image analyzing section that generates analyzing data by which the information type of the region having the effective information present therein can be identified for every pixel from the read image data; and a mask image generating section that converts the analyzing data into a basic pattern for generating the see-through prevention pattern that is associated with the information type beforehand so as to determine the shape of the see-through prevention pattern for every separated region, and determines the region where the analyzing data, of the generated analyzing data pieces, indicating a specific information type is present as the region where the see-through prevention pattern is formed.

3. The image forming apparatus according to claim 2, wherein the analyzing data is represented by a numerical value indicating an information type that identifies at least a region where a character is present, a region where an image is present, and a background region where neither character nor image is present.

4. The image forming apparatus according to claim 3, wherein the mask image generating section determines the region where the analyzing data, which has a numerical value different from the value of the information type indicating the background region, is present as a region to be concealed where the see-through preventing pattern is formed, and the image printing section prints the see-through prevention pattern on the region to be concealed.

5. The image forming apparatus according to claim 2, wherein the mask image generating section thins the analyzing data considering the pixel size of the basic pattern set beforehand, when converting the analyzing data into the basic pattern for generating the see-through prevention pattern, converts the thinned analyzing data into the basic pattern for generating the see-through prevention pattern, and determines the shape of the see-through prevention pattern having the size corresponding to the size of the region where the effective information of the original document is present.

6. The image forming apparatus according to claim 2, wherein the image printing section generates a mirror image pattern of the see-through prevention pattern determined at the mask image generating section, and prints by utilizing the mirror image pattern.

7. The image forming apparatus according to claim 2, further comprising, an input section that inputs selection information for selecting, among the regions where the effective information is present, the region that should be defined as the region to be concealed, and the image printing section prints the see-through prevention pattern on the selected region to be concealed according to the inputted selection information.

8. The image forming apparatus according to claim 7, wherein the inputted selection information is given to the mask image generating section, and the mask image generating section determines the region where the analyzing data, having the information type agreeing with the given selection information, is present as the region to be concealed.

9. The image forming apparatus according to claim 2, wherein the mask image generating section includes a table that stores beforehand the basic pattern for generating the see-through prevention pattern associated with the information type, and the table is composed of a non-volatile rewritable storage device.

10. An image forming method of an image forming apparatus comprising:

reading image data formed on a document;

separating regions where effective information is present from the read image data, so as to determine, for every separated region, a shape of a see-through prevention pattern and a position at which the see-through prevention pattern is to be formed; and printing the determined see-through prevention pattern only at a corresponding part on a back surface of a recording sheet on which the document is printed, on the basis of the determined shape and position of the see-through prevention pattern, the corresponding part corresponding to any of the regions where the effective information of the document is present, wherein the see-through prevention pattern prevents, when printed on the back surface of the recording sheets, the effective information printed on the front surface from being seen when the recording sheet is transilluminated.

* * * * *